United States Patent
Toval et al.

(10) Patent No.: US 12,455,982 B2
(45) Date of Patent: Oct. 28, 2025

(54) SYSTEM AND A METHOD FOR IDENTIFYING PRIVATE USER INFORMATION

(71) Applicant: BI SCIENCE (2009) LTD, Tel-Aviv (IL)

(72) Inventors: Assaf Toval, Herzeliya (IL); Kfir Moyal, Tel-Aviv (IL); Nimrod Sandlerman, Ramat-Gan (IL)

(73) Assignee: BI SCIENCE (2009) LTD, Tel-Aviv (IL)

( * ) Notice: Subject to any disclaimer, the term of this patent is extended or adjusted under 35 U.S.C. 154(b) by 0 days.

(21) Appl. No.: 17/674,806

(22) Filed: Feb. 17, 2022

(65) Prior Publication Data

US 2022/0327237 A1    Oct. 13, 2022

Related U.S. Application Data (60) Provisional application No. 63/174,061, filed on Apr. 13, 2021.

(51) Int. Cl.
G06F 21/62 (2013.01)
G06F 21/12 (2013.01)

(52) U.S. Cl.
CPC ........ *G06F 21/6254* (2013.01); *G06F 21/121* (2013.01); *G06F 21/6263* (2013.01)

(58) Field of Classification Search
CPC ............. G06F 21/6245; G06F 21/6254; G06F 21/6263; G06F 21/121
See application file for complete search history.

(56) References Cited

U.S. PATENT DOCUMENTS

| | | | |
|---|---|---|---|
| 10,789,385 B1 * | 9/2020 | Jayapalan | G06F 16/5866 |
| 10,878,124 B1 * | 12/2020 | Sitaraman | G06N 5/047 |
| 11,244,340 B1 * | 2/2022 | Morin | G06K 9/6256 |
| 11,797,705 B1 * | 10/2023 | Voinea | G06F 21/6245 |
| 2008/0133531 A1 * | 6/2008 | Baskerville | G06F 21/6254 |
| | | | 707/999.009 |
| 2010/0058291 A1 * | 3/2010 | Hahn | G06F 11/3612 |
| | | | 717/113 |
| 2012/0278331 A1 * | 11/2012 | Campbell | H04N 21/44204 |
| | | | 707/E17.09 |
| 2015/0088720 A1 * | 3/2015 | Acuna-Rohter | G06Q 40/04 |
| | | | 705/37 |
| 2015/0193638 A1 * | 7/2015 | Cook | G06F 16/245 |
| | | | 726/27 |
| 2017/0149793 A1 * | 5/2017 | Spertus | G06F 21/6245 |

(Continued)

*Primary Examiner* — Dao Q Ho
(74) *Attorney, Agent, or Firm* — Smith Tempel Blaha LLC; Gregory Scott Smith (57) ABSTRACT

A method, a computer program, or a computerized system for a first software program to remove private user information from a collection of data items communicated by a second software program to a third software program. The first software program may receive the data collection from the second software program, detect in the data collection a first indicator associated with the particular private user information, detect in the data collection the private user information within a proximity threshold associated with the first indicator, remove the private user information from the data collection to form cleaned data collection, and provide the cleaned data collection to the second software program.

12 Claims, 6 Drawing Sheets

(56) References Cited

U.S. PATENT DOCUMENTS

2018/0247268 A1* 8/2018 Vanasco ............... G06Q 10/107
2018/0374571 A1* 12/2018 Garner .................. G16H 10/60
2020/0082120 A1* 3/2020 Richardson ......... G06F 21/6254
2021/0382949 A1* 12/2021 Yastrebenetsky ..... G06F 21/577

* cited by examiner

SYSTEM AND A METHOD FOR IDENTIFYING PRIVATE USER INFORMATION

FIELD

The method and apparatus disclosed herein are related to surveying user interaction with computer generated content, and, more particularly but not exclusively, to eliminating private user information from the collected interaction data, and, more particularly but not exclusively, to automatically identifying what may consist of private user information.

BACKGROUND

Much research is done analyzing the experience a user may have when surfing the world wide web. The raw data for the research may be known as clickstream data or clickpath data. Various software programs such as browsers, as well as websites, may collect clickstream data. In this respect, clickstream data may include all the data that is provided to a user of a computerized device via any of the outputs of the device, as well as all the data that is provided by the user of a computerized device via any of the inputs of the device. Such data may be alphabetic, numeric, alpha-numeric, graphical, image, etc. All such clickstream data may be divided into public information and private user information (also known as personally identifying information). Such private user information may be initiated and entered by the user, or initiated and presented to the user by the website. In this respect, private user information may be associated with the user whose web activity is monitored, or can be associated with other users. All such private user information should be removed from the collected (clickstream) data. There is thus a widely recognized need for, and it would be highly advantageous to have, a method and a system for identifying what may consist of private user information, detecting such private user information in the collected clickstream data, and removing such private user information from the collected clickstream data.

SUMMARY

According to one exemplary embodiment there is provided a method, and/or a computer program, and/or a computerized system executing the method, and/or the computer program, for removing a particular data item from a communicated collection of data items.

The method may include the actions of receiving the data collection by a first software program, detecting, by the first software program, in the data collection a first indicator of the particular data item, detecting, by the first software program, in the data collection the particular data item within a proximity threshold associated with the first indicator and the particular data item, removing, by the first software program, the particular data item from the data collection to form cleaned data collection, and providing, by the first software program, the cleaned data collection.

According to another exemplary embodiment the first software program may remove the particular data item from the collection of data items communicated by a second software program to a third software program before the data collection is sent by the second software program to the third software program. The first software program may receive the data collection from the second software program, and then providing the cleaned data collection to the second software program.

According to yet another exemplary embodiment the first software program may additionally include communicating, by the first software program, to a fourth software program, an identifier of the particular data item and at least one associated data item detected by the first software program within a predetermined proximity from the particular data item. The associated data item may not be a particular data item, and/or may not be an indicator.

According to still another exemplary embodiment the first software program may additionally receive from the fourth software program one or more of a second indicator associated with the particular data item within a particular proximity, a second particular data item associated with the indicator within a particular proximity, and an updated particular proximity associating the particular with an indicator within the updated particular proximity.

Additionally, according to another exemplary embodiment, the first software program may maintain a plurality of rules, where each rule may include a particular data item to be removed, an identifier of the particular data item, a first indicator, and a proximity threshold associated with the first indicator and the particular data item.

Additionally, according to yet another exemplary embodiment, a fourth software program may also maintain a plurality of rules, where each rule may include an identifier of the particular data item to be removed, a first indicator, and a proximity threshold associated with the first indicator and the particular data item.

Further, according to yet another exemplary embodiment, the first software program may maintain a plurality of rules, where each rule includes at least one of a value of the particular data item to be removed, and a regular expression describing at least the value of the particular data item to be removed.

Still further, according to another exemplary embodiment, the first software program may communicate to a fourth software program an identifier of the at least one of value and regular expression of the particular data item, and at least one associated data item detected by the first software program within a predetermined proximity from the particular data item. The associated data item may not be a particular data item detected by the rule. The associated data item may not be an indicator for detecting the particular data item by the rule.

Even further, according to another exemplary embodiment, the fourth software program may also maintain a plurality of the associated data items received from the first software program, where each of the associated data items is associated with a respective identifier of the particular data item. The fourth software program may determine a new particular data item associated with the respective identifier and a proximity thresholds associated with the new particular data item associated with the respective identifier. Additionally, or alternatively, the fourth software program may determine a new identifier associated with the particular data item and associated with a proximity thresholds associated with the new particular data item associated with the respective identifier.

According to still another exemplary embodiment the associated data item may be a value of the data item, or a regular expression describing at least the value of the data item.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of embodiments disclosed blow involves performing or completing certain selected tasks or steps manually, automatically, or any combination thereof. Moreover, according to actual instrumentation and equipment of preferred embodiments of the method and system presented herein several selected steps could be implemented by hardware or by software on any operating system of any firmware or any combination thereof. For example, as hardware, selected steps could be implemented as a chip or a circuit. As software, selected steps could be implemented as a plurality of software instructions being executed by a computer using any suitable operating system. In any case, selected steps of the method and system disclosed herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF EMBODIMENTS

The principles and operation of a method and a system for removing private user information according to some embodiments may be better understood with reference to the drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The present embodiments comprise a method and a system for removing private user information from data collected by a first computing device and communicated to a second computing device.

In this document the term 'computing device' may refer to any type of computing machine, including but not limited to, a computer, a portable computer, a laptop computer, a mobile communication device, a network server, etc., as well as any combination thereof. The term 'mobile communication device" may refer to devices such as a tablet, a mobile telephone, a smartphone, etc. Such computing device or computing machine may include any type or combination of devices, including, but not limited to, a processing device, a memory device, a storage device, and/or a communication device.

The terms 'user device' or 'client device' may refer to a 'computing device' operated by a user and communicatively coupled to another computing devices such as a network server via a communication network. The term 'network server' or 'server' may refer to any type of 'computing device' that is communicatively coupled to a communication network and may include a cloud computer, etc.

The terms 'a' or "an', as used herein, are defined as one or more than one. The term plurality, as used herein, is defined as two or more than two. The term another, as used herein, is defined as at least a second or more. The terms including and/or having, as used herein, are defined as comprising. The term coupled, as used herein, is defined as connected, although not necessarily directly, and not necessarily mechanically.

The term 'communication network' or 'network' may refer to any type or technology for digital communication including, but not limited to, the Internet, WAN, LAN, MAN, PSDN, wireless networking technology such as PLMN, cellular network, WiMAX, WLAN (Wi-Fi), WPAN (Bluetooth), etc. The term 'communication network' or 'network' may refer to any combination of communication technology, and to any combination of physical networks. The term 'communication network' or 'network' may refer to any number of interconnected communication networks that may be operated by one or many network operators.

The term 'application' may refer to a software program running on, or executed by, one or more processors of a computing devices, and particularly by a mobile computing device such as a mobile telephone, a tablet, a smartphone, etc., as well as any other mobile or portable computing facility. The term 'mobile application' may refer to an application executed by a mobile computing device.

The terms 'clickstream', 'clickpath', 'clickstream data', 'clickpath data', may include all the data that is provided to a user of a computerized device via any of the outputs of the device, as well as all the data that is collected from the user of a computerized device via any of the inputs of the device. Clickstream data may include private user information. Clickstream data may include advertising as well as information, data, and/or computer code pertaining to advertising.

The term private user information may refer to any information, and/or data, and/or content, that is legally deemed as private to any particular user, or a private property of any particular user, or personally identifying any particular user (personally identifying information).

The terms 'visual', 'visual object', 'graphical object', and 'mage' may refer to any type of data provided to the user of the client device or provided by the user of the client device. Such visual data may include text, symbols of any kind and shape, as well as images, such as pictures, video streams, etc.

The terms 'type', 'class' and 'characteristic' may refer to any kind of parameter, or a parameter value, or a range of values of a particular parameter, that may be common to a plurality of data items, or data records, or 'graphical objects', or images, etc.

The term 'advertising' or 'advertisement' may refer to content provided by a third party to a user of an application. An advertisement may be provided to the user in any sensible form such as sound, text, image, video, etc., and combinations thereof. In this sense, for example, the advertisement is provided to the user by the application within the application's screen display, or soundtrack, or any similar medium used by the application. Such advertisement may include private user information.

The term 'advertisement placeholder' (or ad placeholder) may refer to a place within an application, and particularly to an area within a screen display of an application, that may receive an advertisement, or in which an advertisement may be placed. An 'advertisement placeholder' may be associated with, or include, a bidding code. An advertisement placeholder may include code that may communicate with another computerized device, such as a network server, such as an ad server or ad agent. Such communication may include private user information.

The term 'bidding code' may refer to a software program that may be associated, for example, with an advertisement placeholder, and may communicate with an advertisement agent to enable advertisers to bid for the advertising place and communicate an advertisement to be displayed to the user. Such communication associated with the bidding code may include private user information.

A purpose of embodiments described herein may be to remove private user information from data collected by a client device and communicated to a server. The client device may collect data in the course of executing a software program and/or interacting with an Internet website or content server.

Figure 1:
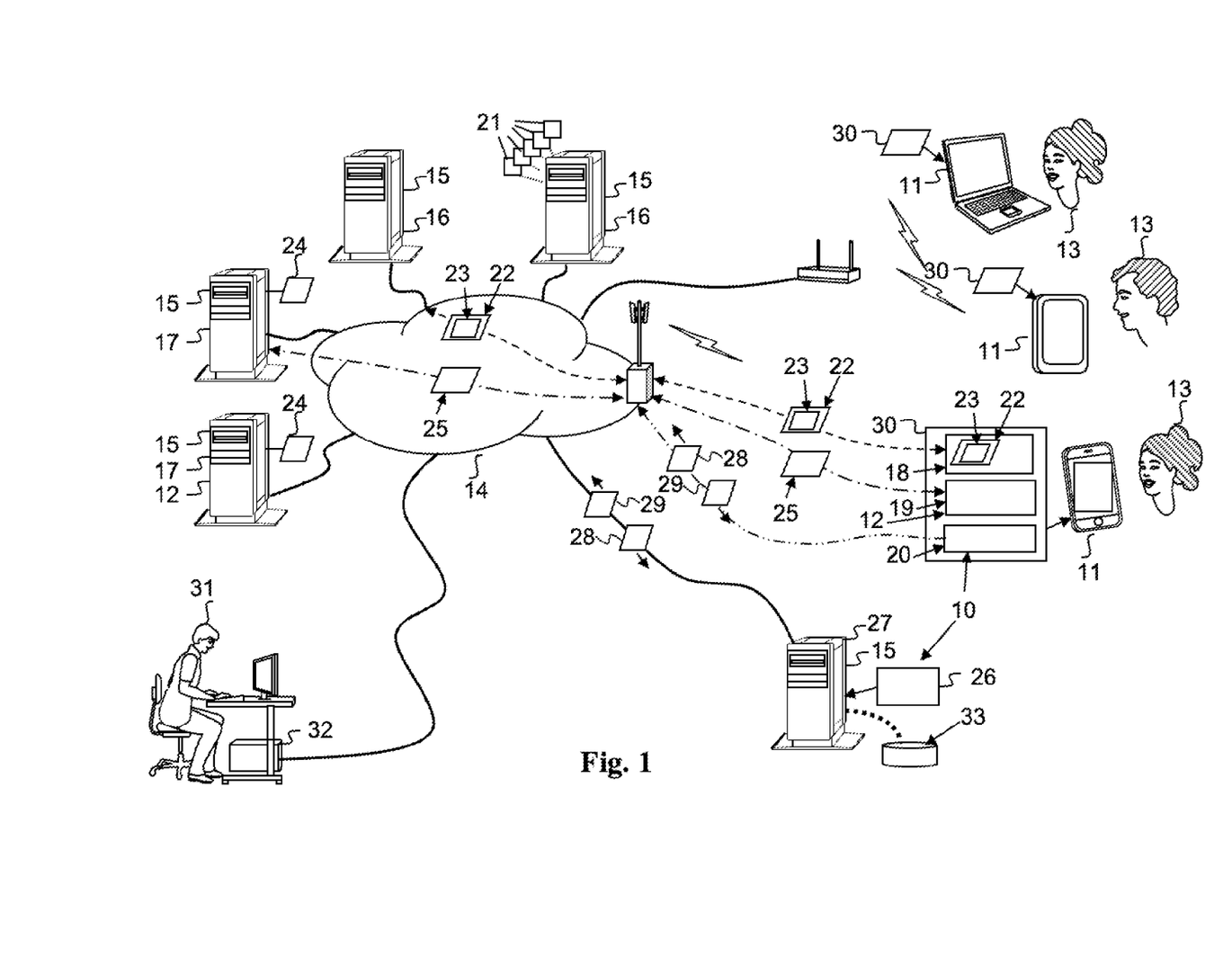
FIG. 1 is a simplified illustration of a including privacy control system and a survey system, both operating partly within a plurality of client devices.

Reference is now made to FIG. 1, which is a simplified illustration of an exemplary embodiment of the present invention including a privacy control system 10 operating partly within at least one client devices 11 and a survey system 12, also operating partly within the client device 11, according to one embodiment.

FIG. 1 shows a plurality of first users 13, each using a respective computational device, which is termed here client device 11. Each client device 11 may be communicatively coupled to a communication network 14 via any communication technology including WAN, LAN and PAN, whether wired or wireless. Each client device 11 may be communicatively coupled via communication network 14 to one or more network servers 15. For example, each client device 11 may be communicatively coupled via communication network 14 to a content providing network server 16 (content server 16), and to a survey server 17.

FIG. 1 shows client device 11, for example, as a mobile telephone or a smartphone, or a tablet computer, or a laptop computer. However, client device 11 may be any type of computer including a desktop computer, etc.

Each client device 11 may execute software programs, such as one or more applications 18. Each client device 11 may also execute a client surveying software program 19, which may be part of the surveying system 12. Each client device 11 may also execute a client privacy control software program 20 (client privacy software 20), which may be part of a privacy control system 10. The term 'execute' may refer to a processor of a computational device (such as client device 11) executing a software program code embodied on a non-transitory computer readable medium.

Any of the applications 18 may include a user interface for interacting with user 13. Such user interface may include various input and output devices for presenting content to user 13, and/or for receiving content from user 13, or under the control of user 13. Such content (e.g., content 21) to be presented to user 13 may be received from one or more content servers 16. Such content received from user 13 may be communicated to one or more content servers 16. Such content communicated between user 13 and one or more content servers 16 may be referred to as clickstream data 22. Such clickstream data may include private user information 23.

Surveying system 12 may include client surveying software program 19 (e.g., client survey software 19) installed in and executed by client device 11 and server surveying software program 24 (e.g., server survey software 24) installed in, and executed by, one or more surveying servers 17. Client survey software 19 may collect clickstream data, in whole or in part, and communicate the collected clickstream data, in whole or in part, to a respective server survey software 24.

It is appreciated that the survey may include a large number of users using various computational devices, operating a large variety of applications, including mobile applications, visiting a large variety of websites, and receiving a large variety of advertisements.

It is appreciated that several surveys may be performed at the same time, or concurrently, by several different survey systems 12. It is appreciated that each surveying server 17, and/or server survey software 24, may communicate with any number of client device 11, and/or client survey software programs 19. It is appreciated that a client device 11, and/or a client survey software 19, may communicate with any number of surveying servers 17, and/or server survey software programs 24.

One purpose of the privacy control system 10 is to remove private user information 23 from the collected clickstream data 25 communicated from client survey software 19 to server survey software programs 24. For this purpose, privacy control system 10 may include client privacy software 20 installed in, and executed by respective one or more client devices 11, and server privacy control software program 26 (server privacy software 26) installed in, and executed by respective one or more privacy control servers 27. It is appreciated that a single privacy control server 27 (or server privacy software 26) may operate with any number of client privacy software programs 20.

To facilitate the detection, identification, and removal of private user information 23 from the communicated clickstream data 25, server privacy software 26 and client privacy software programs 20 may communicate privacy related content 28 and privacy related instructions 29.

It is appreciated that client devices 11 may each execute a software package 30, which may include various versions of one or more applications 18, one or more client survey software 19, and client privacy software 20.

FIG. 1 also shows a user 31, such as a system administrator, operating privacy control system 10, for example, using an administration terminal 32. FIG. 1 also shows a database, or data repository 33, which may be a part of privacy control system 10.

It is appreciated that client survey software 19 and server survey software programs 24 may be parts of a survey system, and that such survey system is used herein as an example of a system that may collect data, such as clickstream data 22, from a client device 11, and/or an application 18. It is appreciated that clickstream data 22 is used here as an example of any type of data collected by client survey software 19 or a similar software program, and communicated to an external software program represented herein as server survey software programs 24.

It is appreciated that any of client privacy software 20, and/or client survey software 19, and/or applications 18, may be combined and provided as a single software program. Similarly, the sever software programs such as server survey software 24 and server privacy software 26 may be combined and provided as a single software program.

Figure 2:
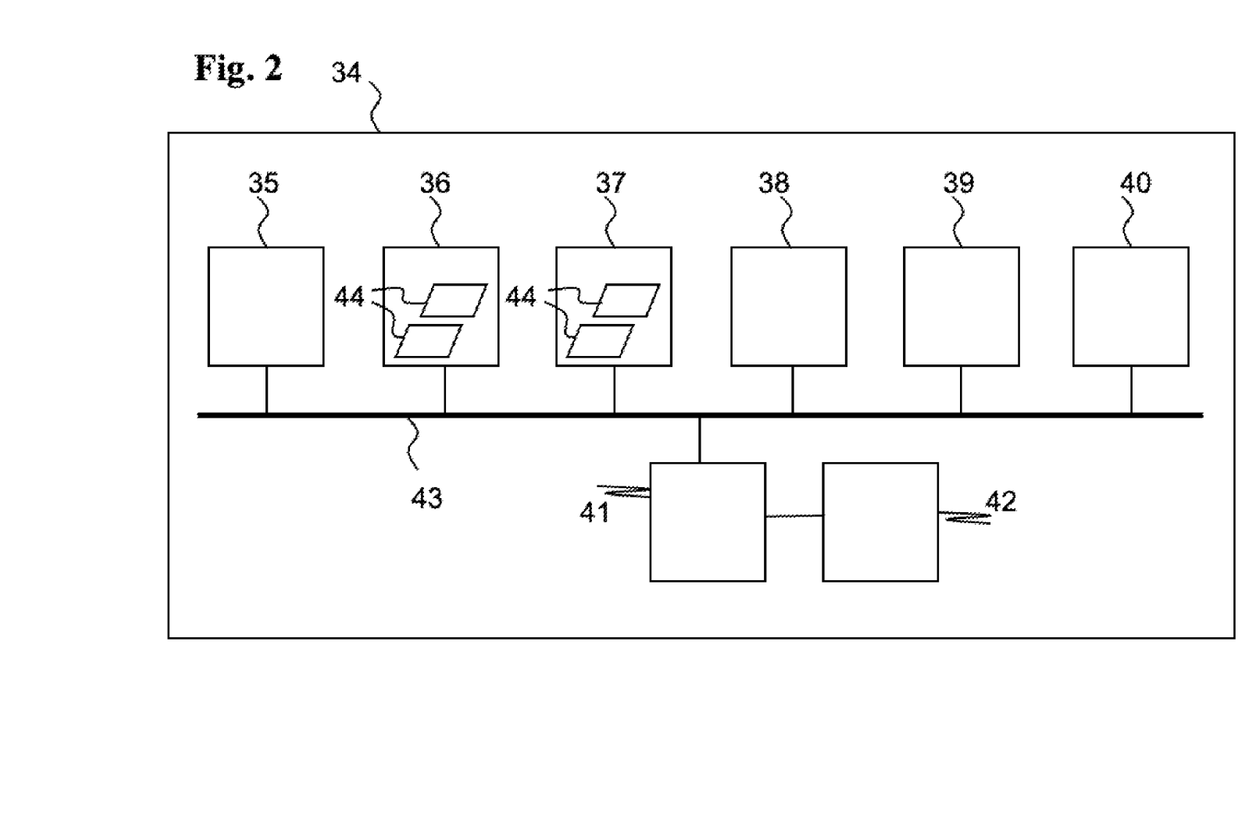
FIG. 2 is a simplified block diagram of computing device such as the client devices or servers of FIG. 1.

Reference is now made to FIG. 2, which is a simplified block diagram of computing device 34, according to one embodiment.

As an option, the block diagram of computing device 34 of FIG. 2 may be viewed in the context of the details of the previous Figures. Of course, however, the block diagram of computing device 34 of FIG. 2 may be viewed in the context of any desired environment. Further, the aforementioned definitions may equally apply to the description below.

It is appreciated that client device 11, and/or network server 15, may be embodied as one or more computing devices 34 (or computational devices 34). Computing devices 34 can therefore represent a smartphone, a tablet, a laptop computer, a desktop computer, a network server 15, or a part of a network server 15, or a plurality of network servers 15, or a data-center, including cloud-based computing infrastructure.

In this respect, survey system 12 may be embodied using one or more computing devices 34.

Computing device 34 may therefore be operative to provide computing infrastructure and resources for any type and/or instance of software component executed within survey system 12. In this regard computing device 34 is operative to process any of the prrocesses described herein. Particularly, computing device 34 one or more non-transitory computer readable media on which software program code may be embodied.

As shown in FIG. 2, computing device 34 may include the following components:

At least one processor unit 35 operative to execute one or more software programs as disclosed with reference to FIG. 1.

One or more memory units 36, e.g. random-access memory (RAM), a non-volatile memory such as a Flash memory, etc., operative to store software programs, parameters, data, databases, digital content, etc.

One or more storage units 37 including, for example, a hard disk drive and/or a removable storage drive, representing a floppy disk drive, a magnetic tape drive, a compact disk drive, Flash drive, etc. The removable storage drive reads from and/or writes to a removable storage unit in a well-known manner. The storage units being operative to store software programs, parameters, data, databases, digital content, etc.

One or more communication units 38 operative to communicatively couple computing device 34 to at least one communication network 14 as disclosed herein and in FIG. 1.

One or more graphic processors 39 and displays 40 operative to enable a user to operate and control computing device 34 and software programs executed by computing device 34.

A power supply 41 and power source 42, such as a battery, for example, if computing device 34 is a mobile, and/or portable, computing device.

One or more communication buses 43 connecting the above units.

One or more computer programs 44, or computer control logic algorithms, which may be stored in any of the memory units 36 and/or storage units 37. Such computer programs, when executed, enable computing device 34 to perform various functions (set forth herein, for example). Memory units 36 and/or storage units 37 and/or any other storage are possible examples of tangible computer-readable media.

It is appreciated that any software program of FIG. 1 may be embodied as a computer program 44 of FIG. 2. For example, applications 18, client surveying software program 19, client privacy software 20, server survey software 24, server privacy software 26, etc.

Figure 3:
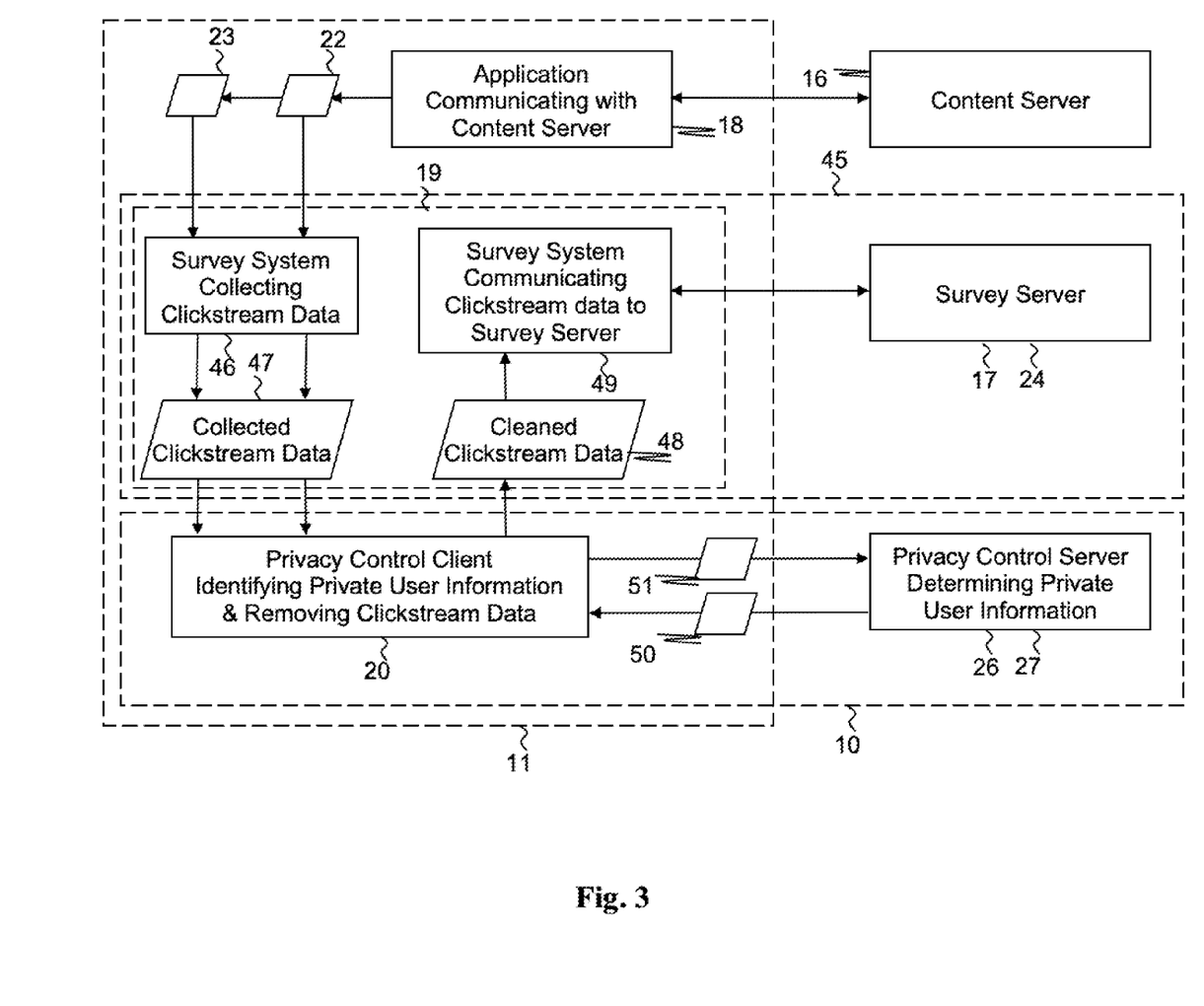
FIG. 3 is a simplified block diagram of the privacy control system operating with the survey system including a surveying application.

Reference is now made to FIG. 3, which is a simplified block diagram of privacy control system 10 operating with a survey system 45, surveying application 18, according to one exemplary embodiment.

As an option, the block diagram of FIG. 3 may be viewed in the context of the details of the previous Figures. Of course, however, the block diagram of FIG. 3 may be viewed in the context of any desired environment. Further, the aforementioned definitions may equally apply to the description below.

As shown in FIG. 1, application 18 is interacting with a content server 16, thus generating clickstream data 22, which may include private user information 23. Client survey software 19, being a part of the survey system 45 may include a data collection process 46 that may collect clickstream data 22, in whole or in part, as well as private user information 23, in whole or in part, producing collected clickstream data 47.

It is appreciated that client survey software 19, and/or its data collection process 46, may collect clickstream data 22 from any number of applications 18, whether executed in different times or at the same time.

Client privacy software 20 of privacy control system 10 may retrieve the collected clickstream data 47, identify the private user information 23 in the collected clickstream data 47, remove the private user information 23 from the collected clickstream data 47, thus producing cleaned clickstream data 48.

Client survey software 19 may include a process 49 that may receive the cleaned clickstream data 48 from client privacy software 20, and communicate the cleaned clickstream data 48 to server survey software 24 of survey system 45.

Client privacy software 20 may identify the private user information 23 in the collected clickstream data 47 according to private user information identification rules 50 that client privacy software 20 may receive from server privacy software 26. Server privacy software 26 executed by privacy control server 27 of privacy control system 10.

In this regard, the term 'rule', and/or identification rule, and/or private user information identification rule, may refer to any method for identifying any particular data item, and/or content item, withing the clickstream data. Such method may include providing one or more parameters characterizing the particular data item to be identified. Such method may include providing a computer code for identifying the particular data item. Such method may include providing a data structure, or string structure, which may characterize the structure of the particular data item, for example, using one or more regular expressions. Such method may include providing artificial intelligence (AI) model that may recognize the particular data item. Such AI model may include natural language processing technology. Any combination of the above is contemplated.

A rule 50, and/or identification rule 50, and/or private user information identification rule 50, may include computer means, such as computer code, or a similar mechanism, to evaluate the probability that a clickstream data item is properly identified as private user information. Particularly, an AI model may provide such measure of probability. However, such means to evaluate the probability is not limited to AI models.

In this regard, a rule 50 may include a particular data value that is considered private user information. Such particular data value may take the form of a particular data number (e.g., a particular data string of digits), a particular data text (e.g., a string of alphabetic characters), a particular data alphanumeric string, a literal expression, etc.

In this regard, a rule 50 may include computer means in the form of a string structure. The string structure may have a form such as a regular expression (e.g., regex). Regular expressions are known and used, such as IEEE Portable Operating System Interface (POSIX) standards (BRE, ERE, SRE), Perl Compatible Regular Expressions (PCRE), etc. Such regular expressions may be extended with spatial and/or temporal proximity, as well as particular actions such as user actions. A user action may include data entry, selection, etc.

In this regard, a rule 50 may include any combination of any of the methods described above. For example, two or more literal expressions and/or string structures (regular expressions) and/or user actions that may be associated by means such as spatial and/or temporal proximity. Spatial proximity may refer to proximity in terms of webpage and/or screen display. Temporal proximity may use a measure of time and/or order of actions, etc.

Additionally, the rule, or means to evaluate probability of identification, may also include one or more threshold values. Such threshold value may determine, for example, that the associated clickstream data item is private user information, or suspected private user information, or otherwise raw clickstream data, etc.

Each rule 50 may have a rule identifier, or a similar means by which, for example, an instance of the client privacy software 20 may indicate to a server privacy software 26 that a particular rule 50 has identified private user information.

It is appreciated that client privacy software 20 may process collected clickstream data 47 of any number of data collection processes 46, of any number of instances of client survey software 19, and/or survey systems 45.

It is appreciated that server privacy software 26 of a privacy control system 10 may communicate with any number of instances of client privacy software 20.

Server privacy software 26 may receive from any number of instances of client privacy software 20 raw clickstream data 51. Server privacy software 26 may analyze raw clickstream data 51 to produce identification rules 50. Server privacy software 26 may then communicate the identification rules 50 to any number of instances of client privacy software 20 executed by respective number of client devices 11. It is appreciated that application 18, client survey software 19, and client privacy software 20 may be executed by (a processor of) the same client devices 11.

In the scope of FIG. 3, raw clickstream data 51 may include any part of the collected clickstream data 47 obtained by client privacy software 20, and/or private user information 23 identified by client privacy software 20, and/or identification data identifying private user information 23 identified by client privacy software 20 (without communicating the private user information 23 data), and/or clickstream data items suspected to be private user information, as determined by client privacy software 20, etc.

Figure 4:
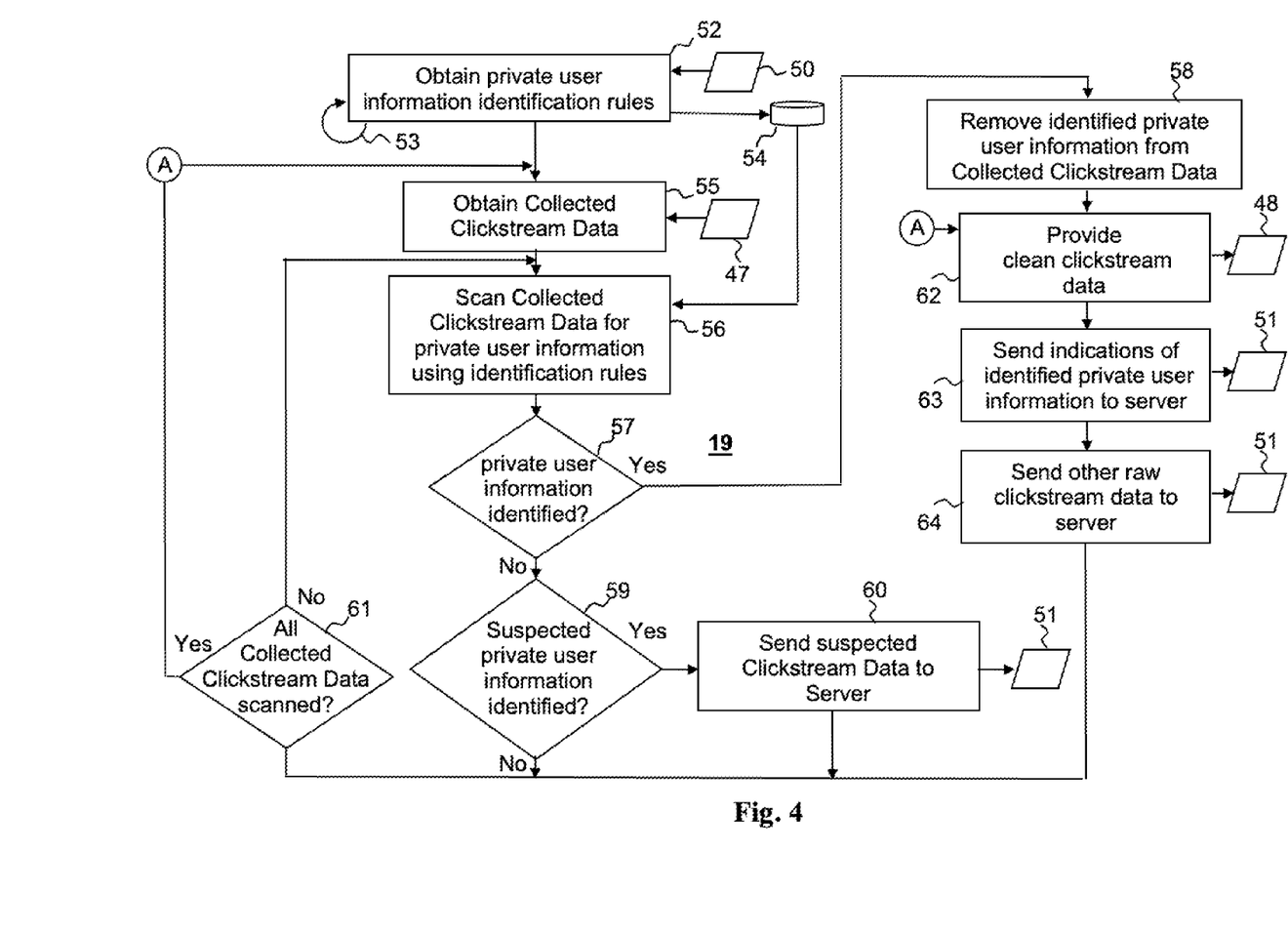
FIG. 4 is a simplified flow chart of client privacy control software program, which is a part of the privacy control system executed by a client device.

Reference is now made to FIG. 4, which is a simplified flow chart of client privacy control software program 20 (client privacy software 20), according to one exemplary embodiment.

As an option, the flow chart of FIG. 4 may be viewed in the context of the details of the previous Figures. Of course, however, the flow chart of FIG. 4 may be viewed in the context of any desired environment. Further, the aforementioned definitions may equally apply to the description below.

Client privacy software 20 may start with process 52 by obtaining identification rules 50 for facilitating the identification of private user information. Process 52 may continue indefinitely, continuously or repetitively, as denoted by arrow 53. Process 52 may maintain the private user information identification rules 50 collected over time in a rules repository 54 (or rules database 54, or rules list 54).

Client privacy software 20 may then proceed to process 55 to obtain collected clickstream data 47 from a collocated supervised software program such as client survey software 19.

Client privacy software 20 may then proceed to process 56 to scan the collected clickstream data 47 to identify any one or more private user information items. This scanning operation may use any of the identification rules 50 to determine if a data item of the collected clickstream data 47 is private user information, or suspected as private user information, or is plain and/or clear data. Client privacy software 20, and/or process 56 may use identification rules 50 collected over time and/or maintained in rules repository 54.

In action 57, if a particular data item of the collected clickstream data 47 is identified as private user information, client privacy software 20 may proceed to process 58.

If, in action 57, the particular data item of the collected clickstream data 47 is not identified as private user information, but, in action 59, the particular data item of the collected clickstream data 47 is identified to be suspected as private user information, client privacy software 20 may proceed to process 60.

Client privacy software 20 may continue with the scanning of process 56 and actions 57 and 59 until all the collected clickstream data is scanned (action 61) and then client privacy software 20 may return to process 55 to obtain more collected clickstream data 47.

In process 58, client privacy software 20 may remove the private user information scanned and identified in process 56 and actions 57 from the collected clickstream data 47. When all the collected clickstream data 47 is scanned, as indicated by connector "A", client privacy software 20, via process 62, may provide a cleaned clickstream data 48 to client survey software 19.

Cleaned clickstream data 48 is collected clickstream data 47 with all the private user information 23 identified by client privacy software 20 and/or scanning process 56 being removed.

Client privacy software 20 may then continue to process 63 and process 64 to communicate raw clickstream data 51 to server privacy software 26. In process 63, client privacy software 20 may communicate raw clickstream to server privacy software 26 including indications, such as identification data of private user information 23 identified and removed by client privacy software 20. Such indication data does not include the private user information 23 itself, but may uniquely identify the associated private user information 23. Alternatively, and/or additionally, the indication may identify the particular rule 50 that has identified the private user information.

In process 60, client privacy software 20 may communicate to server privacy software 26 raw clickstream data 51 including clickstream data suspected to be private user information 23. Such suspected private user information may also include the relevant rule, or an identification of the relevant rule, that was used by client privacy software 20 to determine that the associated clickstream data item may be private user information.

In this respect, client privacy software 20, or process 56 thereof, may determine that a particular clickstream data item is identified as private user information, or is identified as suspected to be private user information, by comparing the evaluated probability of the respective identification with one or more thresholds. For example, a private information threshold, and a suspected private information threshold.

In process 64, client privacy software 20 may communicate other raw clickstream data to server privacy software 26. For example, such raw clickstream data may include data items that are not identified as private user information, or suspected private user information, but appear in close proximity to such private user information, or suspected private user information, and are not considered to be common data items. For example, data items that appear for the first time in close proximity to private user information, or suspected private user information.

The term 'proximity' may refer to the distance, temporal and/or spatial, between elements of a string for identifying a particular type of private user information. Such proximity, or distance may have one or more thresholds, and may be measured and reported. Proximity data may be communicated by server privacy software 26 to client privacy software 20 to indicate how to detect any particular private user information or type of private user information. Proximity data may be communicated by client privacy software 20 to server privacy software 26 to indicate the actual distance between any particular private user information and any data item (including other private user information).

Proximity spatial distance may be computed, and/or communicated, for example, in terms of the number of characters between two particular data items of the clickstream data. Alternatively or additionally, spatial distance, may be computed and/or communicated, for example, in terms of the total number of characters of a particular sequence of data items of the clickstream data. For example, counting the characters from the first character of the first data item of the particular sequence of data items to the last character of the last data item of the particular sequence of data items. In this regard, spatial distance, or spatial correlation, may be communicated also as a regular expression.

Alternatively or additionally, spatial distance, may be determined if two or more data items of the clickstream data appear on the same screen, or within a predefined distance on the screen. Such distance may be measured, for example, as a number of pixels. Alternatively or additionally, spatial distance, may be determined if two or more data items of the clickstream data appear within the same webpage, and/or within the same display frame, etc.

Temporal proximity, or temporal distance, may be computed, for example, in terms of the number of seconds that have passed between two or more particular data items entered by a user such as user 13 of applications 18. Temporal proximity may also indicate order, for example, in terms of positive or negative number of seconds. In this regard, an indicator may indicate an earlier entered data item or a later entered data item as private user information.

Figure 5:
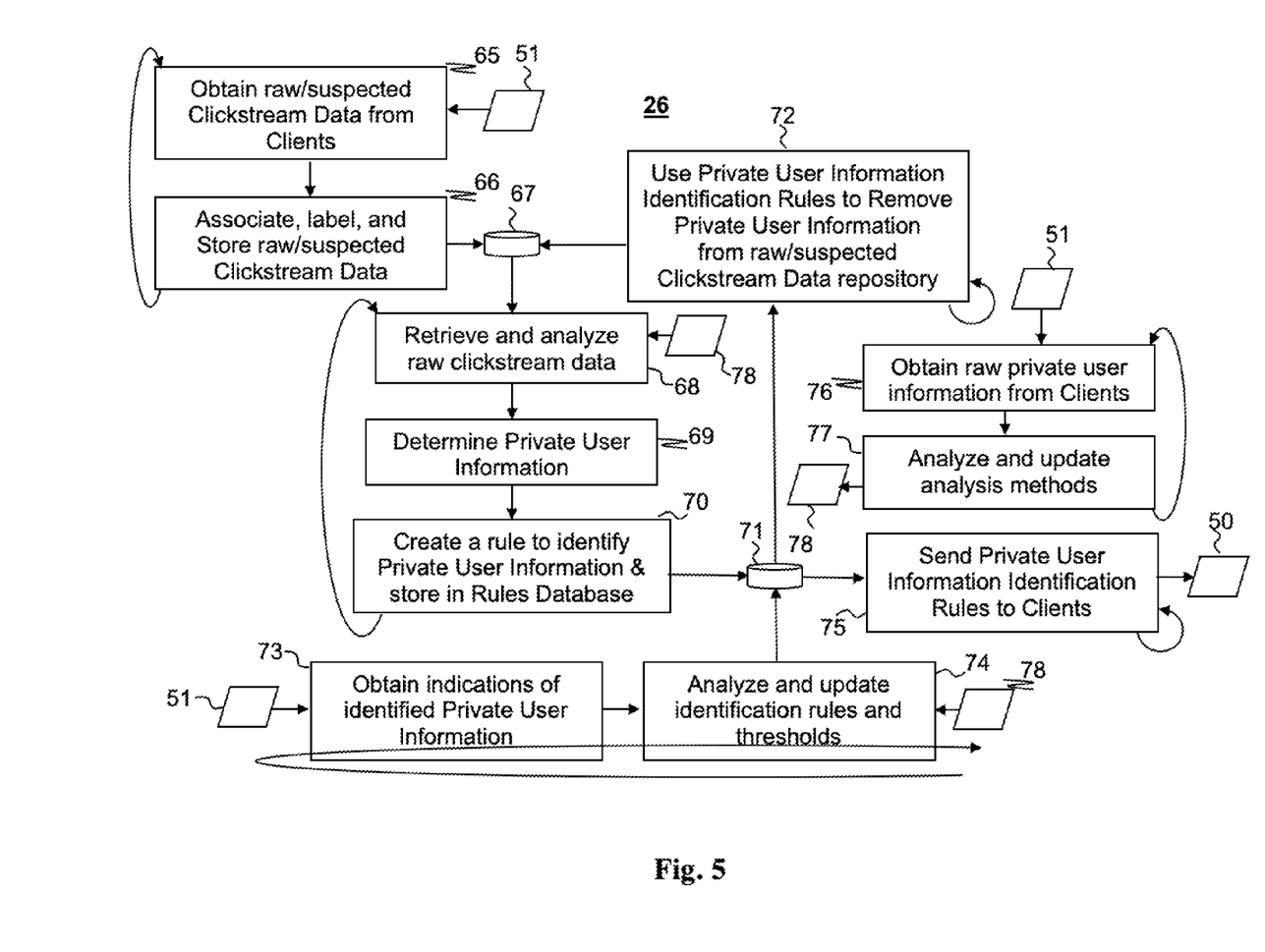
FIG. 5 is a simplified flow chart of a server privacy control software program which is a part of the privacy control system executed by a server over a communication network.

Reference is now made to FIG. 5, which is a simplified flow chart of a server privacy control software program 26 (server privacy software 26), according to one embodiment.

As an option, the flow chart of FIG. 5 may be viewed in the context of the details of the previous Figures. Of course, however, the flow chart of FIG. 5 may be viewed in the context of any desired environment. Further, the aforementioned definitions may equally apply to the description below.

As shown in FIG. 5, server privacy software 26 may include six processes that may be executed in parallel, or simultaneously, or at the same time, as may be indicated by their respective backward curved arrows. However, it is anticipated that the processes may also be executed sequentially or in various combinations of sequential and simultaneous execution. In other embodiments, each of the processes can be active and waiting to be triggered upon the reception of input to be processed.

A first process may include sub-process 65 and sub-process 66. Sub-process 65 may obtain, for example from client privacy software 20, for example from process 60 and/or process 64, raw clickstream data 51, for example including clickstream data suspected to be private user information but not properly identified as such.

Sub-process 66 may prepare the collected raw clickstream data 51 for analysis, for example, by associating each particular data item of the raw clickstream data 51 with one or more other data elements as well as other data items. For example, any type of such association may take the form of labeling the particular item of the raw clickstream data 51 as is common in preparing a dataset for AI training.

A clickstream data item may be associated with one or more data elements such as an identification of the source of the data item, for example, the source client device 11, and/or the associated user 13, the associated source application 18, the associated content 21, etc. The associated content 21 may be identified, for example, by an IP address, uniform resource locator (URL), uniform resource identifier (URI), etc.

A clickstream data item may be associated with one or more data items, including any other private user information data item, and/or a data type, and/or a string structure, etc. Such association may take the form of a measure of proximity, including spatial proximity and temporal proximity.

Sub-process 66 may then store the particular item of the raw clickstream data 51 with its association data and/or labeling in a storage 67, or repository 67, or database 67, of raw clickstream data.

A second process may include sub-process 68, sub-process 69, and sub-process 70. Sub-process 68 may obtain a data item of raw clickstream data from repository 67 and analyze the raw clickstream data to determine if it may be considered as new private user information. This private user information is new in the sense that no present identification rule 50 can determine that this data item is private user information with probability above the respective private information threshold.

Sub-process 69 then determines, based on the results of the analysis of sub-process 68, that the particular data item should be considered as private user information. Thereafter, sub-process 70 may create a respective identification rule 50 to enable client privacy software 20 to recognize such data items in the collected clickstream data 47. Sub-process 70 may then store the new identification rule 50 in a rules repository 71, or rules database 71.

A third process 72 may then use the new identification rule 50 (as well as all other identification rules 50) to remove similar data items recognized as private user information from the raw clickstream data repository 67.

A fourth process may include sub-process 73 and sub-process 74. Sub-process 73 may obtain, for example from client privacy software 20, for example from process 63, raw clickstream data 51, for example including indications of clickstream data items identified as private user information.

Such indication may include the clickstream data item identified to be private user information. Alternatively, such indication may include a value associated with the clickstream data item, such as a calculated by a hashing function. Alternatively, such indication may include an indexing number associated with the particular data item. Other methods of identification are contemplated.

Such indication may also include the identification rule 50 used to identify the particular data item, or an indexing number associated with the particular identification rule 50, or a similar means of rule identification. Such indication may also include the probability of identification.

Sub-process 74 may then analyze the private user information data item with respect to similar private user information data items and may amend the respective identification rule 50, and/or the respective probability evaluation function, and/or any respective probability threshold, etc. Sub-process 74 may then update the rules repository 71.

A fifth process 75 may distribute new identification rules 50, or amended identification rules 50, or other identification rules updates to any number of instances of client privacy software 20.

A sixth process may include sub-process 76 and sub-process 77. Sub-process 76 may obtain, for example from a plurality of instances of client privacy software 20, clickstream data, such as raw clickstream data as described above. Sub-process 77 may then analyze the collected clickstream data to create or amend or improve the analysis methods 78, as may be used by sub-process 69 and/or sub-process 74.

As described above, an embodiment of the present method and system for identifying and removing private user information may be based on a client-server architecture, where the server software determines what is private user information and how to detect it, and thereafter, using the server-defined characterizations, the client software in the client devices may identify and remove the private user information.

Particularly, the client software may identify such private user information in data to be communicated to another software program, or by another software program. The client software may then remove the identified private user information from the data before the data is communicated.

For example, an embodiment of the present method and system for identifying and removing private user information may determine the typical structure of each type of private user information, and 'black-list' the typical 'private structure', as well as all the particular values used with the associated banned (black-listed) structure. It is appreciated that the method of identifying private user information as a string structure is just one optional method of identifying private user information and that other methods are contemplated, such as described above.

In this respect, an embodiment of the present method and system may create and maintain a database of string structures. Such database may be maintained by both the server and the client devices. Particularly, the server may create the database and communicate it, or updates thereof, to client devices. The client devices may use the database to search and identify private user information in the clickstream data (and remove it).

In this regard, to avoid distribution of known private user information, the list of black-listed values of private user information may be maintained only by the client software (e.g., client privacy software 20) serving the respective user 13.

For example, a string of 16 digits, particularly appearing as a series of four sets of four digits, may be determined to represent a credit card number. Hence, the particular string is banned in any form. The banned data may also include other numbers entered by the user in association with the credit card number, such as expiration date, Card Verification Value (CVV), etc. Other rules may be used to identify other sequences such as social security numbers (3 digits, 2 digits and 4 digits in sequence), telephone numbers (3 digits, 3 digits and 4 digits in sequence), etc.

In this respect, a purpose of the method and system may be to formulate a string of symbols, or a plurality of strings of symbols, where each string of symbols characterizes a type of private user information, such as, for example, credit card information. A symbol may be, for example, an alphanumeric character, or a string (sub-string) of alphanumeric characters. The string structure may be defined by one or more characters appearing in the same place in the string. A character in this respect refers to any visual symbol. A further aspect that is pertinent to both collection and retrieval is a language for describing the structure, or format, of a string of characters.

The database maintenance process typically includes two main aspects: collection and retrieval.

The collection aspect refers to the method by which string structures are collected and maintained before they are determined to be private user information. Such strings are termed here 'predetermined structures'. 'Predetermined structures' may be any part of the clickstream data before the private structure is determined. The collection part may be performed by the server.

The retrieval aspect refers to the indexing method by which the private structures are maintained so that the flow of clickstream data can be easily analyzed to determine the private user information. The retrieval part may be performed by the client device.

Considering retrieval, each such string may be associated with one or more other strings, so that when one of these associated strings is detected, the other associated strings are also flagged. Association may be denoted in terms of proximity, such as temporal and/or spatial proximity.

Temporal association may mean that the associated strings may appear within a particular time limit between them. Spatial association may mean that the associated strings may appear on the same screen, or within a limited area of the screen. In this respect, a set of associated strings may be banned, while each string independently may be considered public (e.g., not private) information.

Alternatively, or additionally, associated strings may include a first part (first string structure) that is considered public information, however indicating that the associated second part (second string structure) is considered private user information. In this sense, the first part, or string, or string structure, may serve as an indicator of a particular type of private use information being the second part of the associated string structures.

It is appreciated that the associated string structures may include any number of string structures, and/or string values, and/or indicator parts and private user information parts, and that indicator parts and private user information parts may appear in any order, spatially, and/or temporally.

For example, associated strings may include a first string which value is "name", and/or "address", and/or "email", and/or "identification", etc. Such string may indicate that another, associated, second string appearing withing a particular predetermined temporal and/or spatial proximity. Such associated string, as well as string association, may be determined by the server software based on statistics. The server software may determine any number of first-string structures, as well as any respective number of proximity thresholds within which the respective second-string structure is expected.

One aspect of determining what should be considered private user information is processed by the server by comparing clickstream data received from different client devices, as well as from the same client device when accessing different websites, as well as for different client devices when accessing the same web site.

For example, data items that appear in the click stream of a particular user and do not appear in the clickstream of other users may be considered private user information.

For example, different data items having the same particular structure, which may appear in the click stream data of different users in the same part of a particular screen of webpage, may be considered private user information. Such different data items may have the same particular structure but may have different values. Such different data items (or the same structure but different values) may appear in the same part of a particular screen display, or the same part of a particular webpage, or within a predefined proximity.

As described above, server privacy software 26 may generate new rules 50, and/or update existing rules 50, and communicate such rules 50 to one or more instances of client privacy software 20. Such rules 50 may have various forms.

One form of a rule 50 may be a particular (literal) data value, such as a particular name, a particular address, a particular identification number (e.g. social security identifier), a particular date of birth, etc. Such literal data may be communicated by server privacy software 26 to a particular instance of client privacy software 20 that may serve the particular user, of whom the literal data may be considered private user information.

Another form of a rule 50 may be a string structure, or regex, typically formulated by the server privacy software 26, and/or sub-process 70. Server privacy software 26 may analyze a plurality of raw clickstream data 51. Such plurality of raw clickstream data 51 may be received from the same server privacy software 26 when accessing several different content servers 16. Alternatively or additionally, such plurality of raw clickstream data 51 may be received from the several different instances of server privacy software 26 when accessing the same content server 16, and/or different, content servers 16.

Server privacy software 26 may then determine a generalized format of a plurality of literal private user information, for example in the form of a string structure, or regex. For example, string structures may identify email addresses, US social security numbers, date provided in various orders of day, month and year, credit card numbers, etc. Server privacy software 26 may then distribute such string structures to one or more client privacy software 20.

One another form of a rule 50 may be a combination of one or more literal data values and a string structure, and/or a user action, typically associated with a measure of proximity such as spatial and/or temporal proximity. The literal data value may be a public data such as the word 'name'.

Server privacy software 26 may analyze raw clickstream data 51 to find such literal public data repeatedly appearing within predetermined proximity from an identified private user information as reported in indications of private user information 23 identified and removed by various instances of client privacy software 20. Server privacy software 26 may determine such combinations of literal data values and a string structure, and/or a user action, for example, in sub-process 74.

Server privacy software 26 may analyze raw clickstream data 51, with reference to particular selected literal public data, for example according to rules 50, to determine particular private user information that a respective client privacy software 20 has missed.

Figure 6:
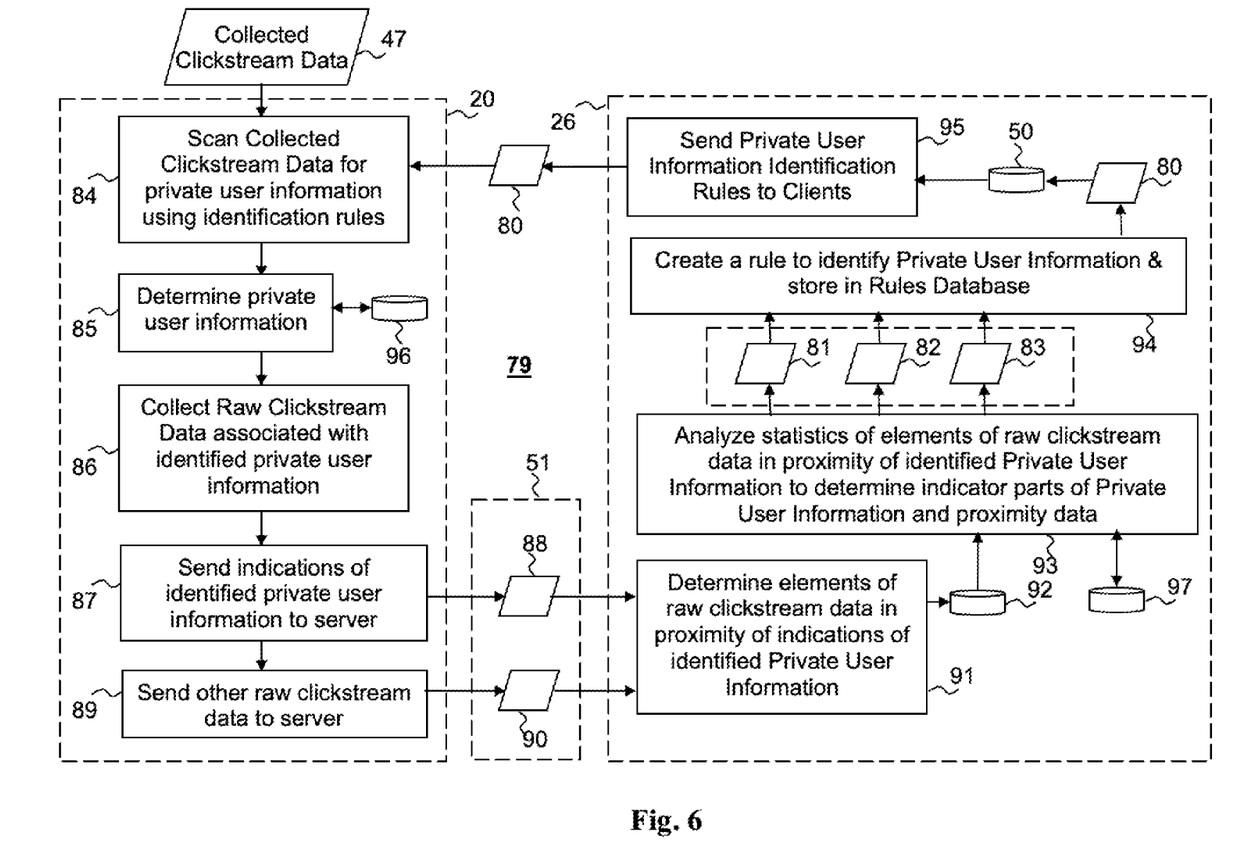
FIG. 6, is a simplified flow chart of a process for creating and using an association rule, which may be executed by the privacy control system.

Reference is now made to FIG. 6, which is a simplified flow chart of a process 79 of creating and using an association rule 80, according to one embodiment.

As an option, the flow chart of process 79 of FIG. 6, may be viewed in the context of the details of the previous Figures. Of course, however, the flow chart of FIG. 6 may be viewed in the context of any desired environment. Further, the aforementioned definitions may equally apply to the description below.

Process 79 may be executed in part by client privacy software 20 and in part by server privacy software 26. Process 79 may be executed a server privacy software 26 and by any number of instances of client privacy software 20.

Association rule 80 may be a type (or more than one type) of rules 50. As described above, association rule 80 may include two or more associated parts and may also include a proximity measure, or threshold. A first part of association rule 80 may include one or more indicators, such as data structures, 81 of data items that may be considered public information, and the second part may include one or more data items, such as data structures, 82 that may be considered private user information. The proximity measure, or threshold, 83 may indicate the temporal and/or spatial relation between any of the data items of the first part, and any of the data items of the second part.

Process 79 for creating association rules 80 may start with action 84 of an instance of client privacy software 20 by receiving clickstream data 47 as described above with reference to FIGS. 3 and 4, and then scanning the clickstream data 47 using any number of rules 50, and particularly (but not limited to) one or more rules 80.

Once a data item is determined by any rule 50 (or rule 80) to be private user information (action 85), the process 79 may proceed to action 86 to collect elements (data items) of the clickstream data 47 within predetermined general proximity of the currently identified private user information.

The term 'general proximity' may refer, for example, to data items presented to the user substantially simultaneously and/or together of the screen display of the respective client device 11. Alternatively and/or additionally, the term 'general proximity' may refer to a display frame, or a similar display feature. The edges of the display, or frame, or any combination thereof, may constitute the limits of the 'general proximity'.

Process 79 may then send to server privacy software 26 (action 87) an identification 88 of the identified private user information (such as the type of the private user information) and also send to server privacy software 26 (action 89) the elements 90 of the clickstream data 47 collected within the predetermined general proximity.

Process 79 may then continue with action 91 of server privacy software 26, which may receive the identification 88 of the data items identified as private user information, and the elements 90 of the clickstream data 47 that are considered within general proximity of their respective identification 88. Action 91 may then determine proximity measures between each data element 90 of the clickstream data 47 and a respective identification 88. Such proximity measure may be spatial, for example, in terms of pixels, or temporal, for example in terms of seconds (positive or negative). Action 91 may then index and store the identifications 88 and their respective proximal data items in a repository and/or database 92, along with their respective proximity measures.

Each record of the repository and/or database 92, such as identification 88 and data elements 90, may also include an association with a particular instance of client privacy software 20 from which the record has been received. Each record of the repository and/or database 92, such as identification 88 and data elements 90, may also include an association with a particular content of a content server 16 with which the respective clickstream data 22 has been exchanged, and received by the client privacy software 20 as collected as clickstream data 47.

Process 79 may then proceed to action 93 of server privacy software 26 to analyze the data in repository and/or database 92 to determine statistical associations between identification 88 and data elements 90. Thus, action 93 may determine that a particular data elements 90 may serve as an indicator 81 for a particular type of private user information 82 that may appear within a particular proximity threshold 83 from the respective indicator 81.

Action 93 may determine the association between a particular indicator 81, a respective private user information 82, and a respective proximity threshold 83. Action 93 may determine the association in terms of probability. Action 93 may determine the probability using artificial intelligence (AI). Action 93 may use AI to cluster data records of the repository and/or database 92 into classes of indicators 81, respective instances of private user information 82, and respective proximity thresholds 83.

Action 93 may determine the association between a particular identifications 88 and instances of data elements 90, with respect to a plurality of client privacy software 20, as well as with a plurality of instances of content of a content servers 16. Hence, if a particular data element 90 appears within general proximity from a known private user information 82. For example, if such occurrence is detected within clickstream data of a plurality of client privacy software 20, and/or within clickstream data associated with a plurality of content instances.

Action 93 may then determine that the particular data elements 90 may serve as an indicator 81 of the private user information 82. Action 93 may then determine the particular proximity threshold between the particular indicator 81 and the respective private user information 82 based on a plurality of such identifications 88 associated with a plurality of content instances.

Action 93 may also determine that a particular data element 90 is an instance of private user information 82, or a particular type of private user information 82. Action 93 may determine a particular private user information 82 if the respective particular data elements 90 repeatedly appears within general proximity of a particular indicator 81. For example, based on a plurality of instances of the particular data element 90 associated with the same client privacy software 20 and not associated with other instances of client privacy software 20.

Action 93 may then determine the particular proximity threshold between the particular indicator 81 and the new respective private user information 82. For example, based on a plurality of such identifications 88 associated with a plurality of content instances.

Process 79 may then proceed to action 94 of server privacy software 26 to create data structures for any of indicators 81, and/or instances of private user information 82, and to create rules 80, by associating indicators 81, or data structures thereof, with private user information 82, or data structures thereof, and with respective proximity thresholds 83, and with a respective identifier 88.

Such rule 80 may be then used by a client privacy software 20 to identify an indicator 81 in the collected clickstream data 47, then identify a respective private user information 82 within the respective proximity threshold 83 from the indicator 81. The newly created rule 80 may be added to a repository or database of private user information identification rules 50.

Process 79 may then proceed to action 95 of server privacy software 26 to distribute private user information identification rules 80, as well as other rules 50 to instances of client privacy software 20.

As described above, client privacy software 20 may maintain a repository and/or database 96 of private user information values. Each of the data items of private user information values of repository and/or database 96 may be associated with a type of private user information and/or an indication of private user information such as a particular identifier 88.

Client privacy software 20 may then determine that a data element of the collected clickstream data 47 is considered private user information because it matches a particular data item of the repository and/or database 96 of private user information values. Client privacy software 20 may then report the respective identifier 88 to the server privacy software 26. Hence, Client privacy software 20 may report to the server privacy software 26 that a particular private user information has been detected without disclosing the value of the particular private user information. The server privacy software 26 may then process the particular private user information with any of the abovementioned methods without the knowledge of the value of the particular private user information.

However, values of private user information that are not yet listed in the to the repository and/or database 96 may be communicated to server privacy software 26, for example as part of the elements 90 of the clickstream data 47 that are considered within general proximity of a respective identification 88. Server privacy software 26 determine that a particular element 90 is a suspected private user information. Server privacy software 26 may maintain all such suspected private user information values in a repository and/or database 97.

When server privacy software 26 determines that a particular suspected private user information data item is private user information server privacy software 26 may communicate the particular value, with an associated particular identification 88, to the respective client privacy software 20. Server privacy software 26 may also update the respective string structure associated with the respective type of private user information as well as update the rules 50 associate with the respective string structure.

Server privacy software 26 may then remove the suspected private user information data item from the repository and/or database 97. Therefore, server privacy software 26 may not include any record of any known value of any private user information. Hence, process 79 may determine rules 50, and particularly rules 80, including determining indicators 81 and proximity thresholds 83, without disclosing known private user information values from the client privacy software 20. To the server privacy software 26.

It is appreciated that process 79 may be executed continuously, and/or repeatedly, to create new rules for detecting and removing private user information, and/or to update such rules. rules for detecting and removing private user information may include rules 50, and/or association rules 80, as well as private user information values. As further rules are created and/or updated by the server privacy software 26 and/or the client privacy software 20, instances of data items including private user information may be removed from data collected by the server privacy software 26, as well as data collected by the survey system 45. Hence, server privacy software 26 may additionally send removal rules to a survey system 45 to remove private user information.

It is appreciated that association rule 80 may include a new indicator 81 for indicating a respective private user information item 82 that is already known to client privacy software 20. Such rule 80 may also include a new proximity threshold 83 associating the new indicator 81 with the respective private user information item 82.

It is appreciated that association rule 80 may include a new private user information item 82 associated with a respective indicator 81 that is already known to client privacy software 20 (e.g., for detecting another private user information item 82). Such rule 80 may also include a new proximity threshold 83 associating the new private user information item 82 with the known indicator 81.

It is appreciated that association rule 80 may include an updated proximity threshold 83 associating a particular private user information item 82 with a respective indicator 81, where both the private user information item 82 and the respective indicator 81 are already known to client privacy software 20.

Other combinations and configurations of rules 80 are also contemplated.

It is expected that during the life of this patent many relevant advertisement systems and applications will be developed and the scope of the terms herein, particularly of the terms "mobile device", "mobile application", "advertisement" or "mobile advertisement", "advertisement bidding", and "bidding agent" or "ad-network", is intended to include all such new technologies a priori.

Additional objects, advantages, and novel features of the embodiments described herein will become apparent to one ordinarily skilled in the art upon examination of the following examples, which are not intended to be limiting. Additionally, each of the various embodiments and aspects of embodiments as delineated hereinabove and as claimed in the claims section below finds experimental support in the following examples.

It is appreciated that certain features of the system and method described herein, which are, for clarity, described in the context of separate embodiments, may also be provided in combination in a single embodiment. Conversely, various features, which are, for brevity, described in the context of a single embodiment, may also be provided separately or in any suitable sub-combination.

Although the system and methods has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A method for automatically removing one or more data items comprising personally identifiable information ("PII") from a collection of data items comprising clickstream data electronically communicated, the method comprising the actions of:

receiving a raw data collection of data items by a first software program running on a privacy control system, the first software program comprising a rules-based intelligence system, the raw data collection of data items being generated by a content server that is interacting with a user or application;

said first software program applying it's rules based intelligence system to parse said raw data collection and detect, in said raw data collection a first PII indicator of a particular data item, the first PII indicator being a part of the raw data collection of data items but not being separate and distinct from the particular data item;

after detecting the first PII indicator, said first software program continuing to apply it's rules based intelligence system, parsing and detecting in said raw data collection said particular data item, wherein said particular data item is within a proximity threshold associated with said first PII indicator and said particular data item has a structure that matches a structure associated with said first PII indicator depicted by the rules based intelligence system;

removing, by said first software program, said particular data item from the raw data collection to form a cleaned data collection that does not include said particular data item but retains the first PII indicator;

providing, by said first software program, said cleaned data collection to an evaluation system to evaluate the cleaned data collection; whereby the PII is not at risk of exposure to the evaluation system;

communicating, by said first software program, to a fourth software program an identifier of said particular data item and at least one associated data item detected by said first software program within a predetermined proximity from said particular data item, said associated data item not being a particular data item, said associated data item not being an indicator; and receiving, by said first software program from said fourth software program:
an updated particular proximity associating said particular data item with an indicator.

2. The method according to claim 1, additionally comprising at least one of:
said first software program removing said particular data item from said raw data collection of data items that is to be communicated by a second software program to a third software program before said raw data collection is sent by said second software program to said third software program;
receiving said raw data collection by the first software program comprises receiving said raw data collection from said second software program; and
providing, by said first software program, said cleaned data collection comprises providing said cleaned data collection to said third software program.

3. The method according to claim 1, additionally comprising at least one of:
said first software program maintaining a plurality of rules, wherein each rule comprises:
a particular data item to be removed;
an identifier of said particular data item;
a first PII indicator; and
a proximity threshold associated with said first PII indicator and said particular data item; and
a fourth software program maintaining a plurality of rules, wherein each rule comprises:
an identifier of said particular data item to be removed;
a first PII indicator; and
a proximity threshold associated with said first PII indicator and said particular data item.

4. The method according to claim 1, additionally comprising at least one of:
said first software program maintaining a plurality of rules, wherein each rule comprises at least one of:
a value of said particular data item to be removed; and
a regular expression describing at least said value of said particular data item to be removed; and
communicating, by said first software program, to a fourth software program an identifier of said at least one of value and regular expression of said particular data item, and at least one associated data item detected by said first software program within a predetermined proximity from said particular data item, said associated data item not being at least one of:
a particular data item detected by said rule, and
an indicator for detecting said particular data item by said rule.

5. The method according to claim 1, additionally comprising:
a fourth software program maintaining a plurality of said associated data items received from said first software program, wherein each of said associated data items is associated with a respective identifier of said particular data item;
said fourth software program determining at least one of:
a new particular data item associated with said respective identifier and a proximity threshold associated with said new particular data item associated with said respective identifier; and
a new identifier associated with said particular data item and associated with a proximity threshold associated with said new particular data item associated with said respective identifier.

6. The method according to claim 5, wherein said associated data item is at least one of:
a value of said data item; and
a regular expression describing at least said value of said data item.

7. A non-transitory computer readable medium storing computer code executable by a processor to perform a method for removing a particular data item that constitutes personal identification information ("PII") from a raw collection of data items electronically communicated, the method comprising the actions of:
receiving a raw data collection by a first software program running on a privacy control system and comprising a rules based system, the raw data collection being generated by a content server that is interacting with a user or application;
said first software program applying it's rules based system to detect, in said raw data collection, a first PII indicator of a particular data item, the first PII indicator being a part of the raw data collection of data items but not being part of the particular data item;
after detecting the first PII indicator, said first software program continuing to apply it's rules based system, detecting in said data collection said particular data item within a proximity threshold associated with said first PII indicator and said particular data item;
removing, by said first software program, said particular data item from the raw data collection to form cleaned data collection that does not include said particular data item but retains the first PII indicator;
providing, by said first software program, said cleaned data collection to an evaluation system to evaluate the cleaned data collection; whereby the PII is not at risk of exposure to the evaluation system;
communicating, by said first software program, to a fourth software program an identifier of said particular data item and at least one associated data item detected by said first software program within a predetermined proximity from said particular data item, said associated data item not being a particular data item, said associated data item not being an indicator; and
receiving, by said first software program from said fourth software program an updated particular proximity associating said particular data item with an indicator.

8. The non-transitory computer readable medium storing computer code executable by a processor according to claim 7, additionally comprising at least one of:
said method executed by a first software program for removing said particular data item from said raw collection of data items that are communicated by a second software program to a third software program before said raw data collection is sent by said second software program to said third software program;

receiving said raw data collection by a first software program comprises receiving said raw data collection from said second software program; and providing, by said first software program, said cleaned data collection comprises providing said cleaned data collection to said second software program.

9. The non-transitory computer readable medium storing computer code executable by a processor according to claim 7, additionally comprising at least one of:

said first software program maintaining a plurality of rules, wherein each rule comprises:
  a particular data item to be removed;
  an identifier of said particular data item;
  a first PII indicator; and
  a proximity threshold associated with said first PII indicator and said particular data item; and
a fourth software program maintaining a plurality of rules, wherein each rule comprises:
  an identifier of said particular data item to be removed;
  a first PII indicator; and
  a proximity threshold associated with said first PII indicator and said particular data item.

10. The non-transitory computer readable medium storing computer code executable by a processor according to claim 7, additionally comprising at least one of:

said first software program maintaining a plurality of rules, wherein each rule comprises at least one of:
  a value of said particular data item to be removed; and
  a regular expression describing at least said value of said particular data item to be removed; and
communicating, by said first software program, to a fourth software program an identifier of said at least one of value and regular expression of said particular data item, and at least one associated data item detected by said first software program within a predetermined proximity from said particular data item, said associated data item not being at least one of:
  a particular data item detected by said rule, and
  an indicator for detecting said particular data item by said rule.

11. The non-transitory computer readable medium storing computer code executable by a processor according to claim 7, additionally comprising:

a fourth software program maintaining a plurality of said associated data items received from said first software program, wherein each of said associated data items is associated with a respective identifier of said particular data item;
said fourth software program determining at least one of:
  a new particular data item associated with said respective identifier and a proximity thresholds associated with said new particular data item associated with said respective identifier; and
  a new identifier associated with said particular data item and associated with a proximity thresholds associated with said new particular data item associated with said respective identifier.

12. The non-transitory computer readable medium storing computer code executable by a processor according to claim 11, wherein said associated data item is at least one of:
  value of said data item; and
  a regular expression describing at least said value of said data item.

* * * * *